United States Patent [19]

Seki

[11] Patent Number: 4,460,071
[45] Date of Patent: Jul. 17, 1984

[54] DISC BRAKE FOR VEHICULAR USE

[75] Inventor: Masayuki Seki, Tateshina, Japan

[73] Assignee: Nissin Kogyo Kabushiki Kaisha, Ueda, Japan

[21] Appl. No.: 339,716

[22] Filed: Jan. 15, 1982

[30] Foreign Application Priority Data

Jan. 17, 1981 [JP]  Japan ............................... 56-5082[U]

[51] Int. Cl.³ ............................................. F16D 65/02
[52] U.S. Cl. ............................. 188/73.39; 188/205 A
[58] Field of Search ................ 188/73.31, 73.34, 73.36, 188/73.37, 73.39, 73.43, 205 A, 344

[56] References Cited

U.S. PATENT DOCUMENTS 3,612,226 10/1971 Pauwels ...................... 188/205 A X

FOREIGN PATENT DOCUMENTS 78825 6/1980 Japan ................................. 188/73.39

*Primary Examiner*—Duane A. Reger
*Attorney, Agent, or Firm*—Posnack, Roberts, Cohen & Spiecens

[57] ABSTRACT

A disc brake including a rotatable disc, a bracket having a pair of limbs and firmly attachable to a vehicle body portion in straddling relation to the disc, and a brake caliper mounted on the bracket, supporting a pair of friction pads on the opposite sides of the disc and having an actuating mechanism operative to press the friction pads against the opposite faces of the disc. The bracket limbs are formed thereon with torque-bearing surfaces which face the adjacent, trailing end faces of the respective friction pads which surfaces are covered with a single protecting plate. The bracket is formed along the top edges of the torque-bearing surfaces with a detent shoulder and in these surfaces at points downwardly spaced a substantial distance from the top edges thereof with a pair of detent holes. The protecting plate is formed on its back with at least one upper detent lug engageable on the detent shoulder and a pair of lower detent lugs engageable in the detent holes. The upper and lower detent lugs cooperate to securely hold the protecting plate in place on the bracket with resilient retention forces acting in two different directions substantially normal to each other.

6 Claims, 5 Drawing Figures

DISC BRAKE FOR VEHICULAR USE

BACKGROUND OF THE INVENTION

1. Field of the Invention

This invention relates to disc brakes for use in automotive vehicles such as motorcycles and more particularly to those of the type including a brake disc, a bracket having a pair of first and second limbs formed with respective torque-bearing surfaces in a common plane and adapted to be firmly mounted on a body portion of the vehicle with the first and second limbs held in straddling relation to the brake disc, a pair of first and second friction pads arranged on the opposite sides of the brake disc with their trailing end faces disposed facing the respective torque-bearing surfaces of the bracket limbs, a brake caliper connected to the bracket in straddling relation to the first and second friction pads and provided with an actuating mechanism operative to press the friction pads against the opposite faces of the brake disc, and a single protecting plate mounted on the bracket to cover the torque-bearing surfaces of the limbs thereof.

2. Description of the Prior Art

In the disc brake of the type described above, the protecting plate is needed for smooth sliding movement of the friction pads as well as for preventing wear of the torque-bearing surfaces of the bracket limbs, which take up the torque transmitted from the brake disc, to the friction pads during braking. Such protecting plate, however, has previously been unsatisfactory involving the danger of its loosening or falling off the bracket.

SUMMARY OF THE INVENTION

Under the circumstances, the present invention has for its object the provision of a new and improved disc brake of the type described which is made particularly simple and sound in structure for the mounting of the single protecting plate on the bracket and free of the danger of the protecting plate loosening or falling off the bracket.

According to the present invention, the above object is attained by forming the bracket with a detent shoulder that extends along the top edges of the torque-bearing surfaces of the bracket limbs and a pair of detent holes in the respective torque-bearing surfaces and forming on the back of the protecting plate upper and lower detent lugs engageable respectively on the detent shoulder and in the detent holes to hold the protecting plate in place on the bracket in cooperation with each other with resilient retention forces acting in two directions substantially normal to each other.

The above and other objects, features and advantages of the present invention will become more apparent by reference to the following description taken in conjunction with the accompanying drawings.

DESCRIPTION OF THE PREFERRED EMBODIMENT

Figure 1:
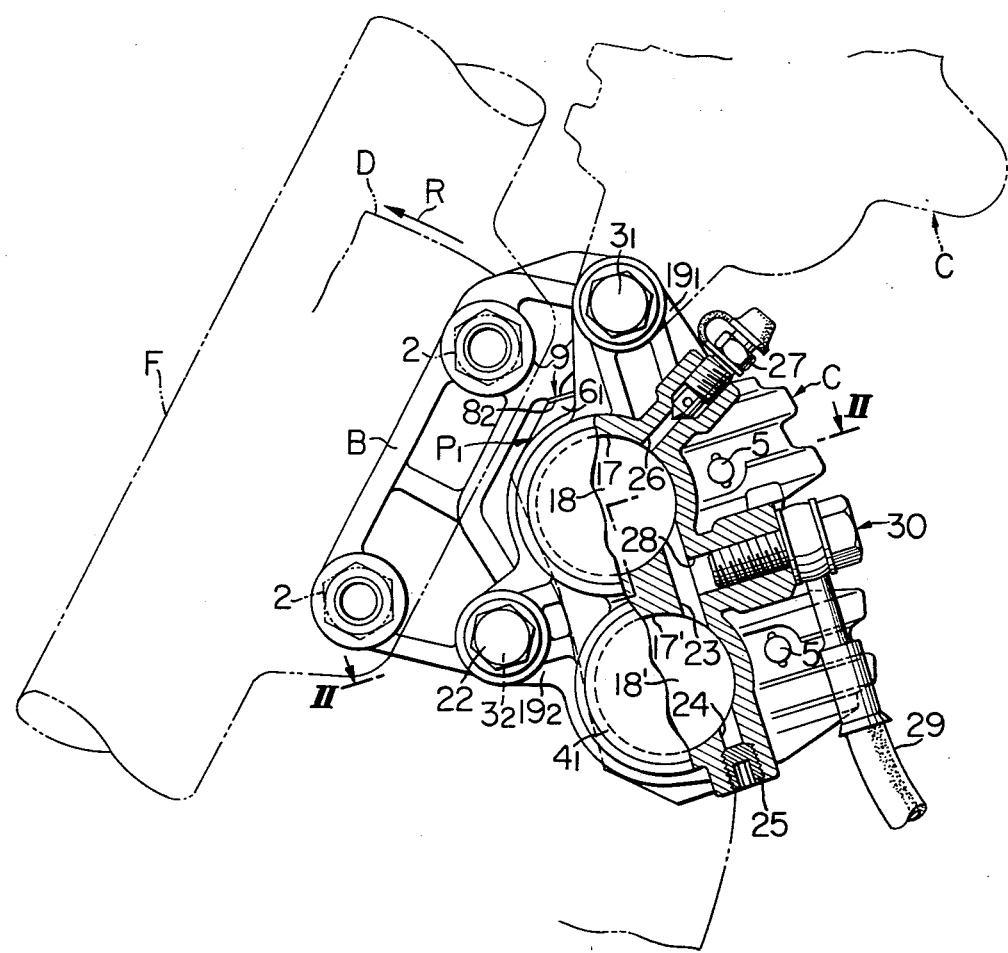
FIG. 1 is a side view, partly of cross section, in a disc brake construction for vehicular use embodying the present invention.
Figure 5:
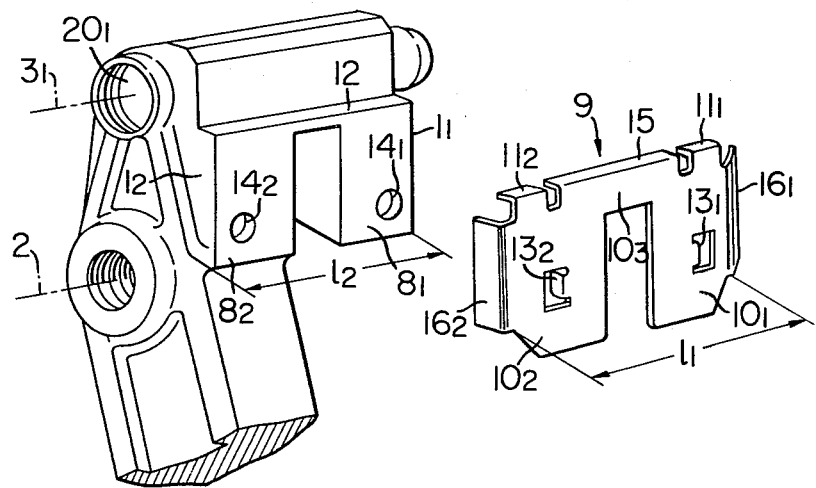
FIG. 5 is a detached perspective view of the bracket and the protecting plate removed therefrom.

Description will now be made with reference to the drawings, which show a disc brake for use in a two-wheeled motorcycle, which embodies the principles of the present invention. Reference character D indicates a brake disc rotatable with the associated wheel, not shown, in the direction of the arrow R during forward travel of the vehicle. Arranged adjacent to the brake disc on one side thereof is a bracket B, cast of an aluminum alloy, which extends substantially in a direction radially of the brake disc D. As shown in FIG. 5, the bracket B is shaped at the top as an inverted "U", including a pair of limbs $1_1$ and $1_2$ spaced apart to straddle the brake disc D. The bracket B is firmly attached to a body portion, e.g., front fork F, of the vehicle by means of mounting bolts 2. A brake caliper C is connected to the bracket B by means of a pair of first and second slide pins $3_1$ and $3_2$ which extend parallel to the axis of rotation of brake disc D. As seen in FIG. 1, the bracket B is substantially in a position on one side of caliper C along the circumference of brake disc D, in the example illustrated, on the trailing side of caliper C relative to the rotation of the brake disc.

Figure 2:
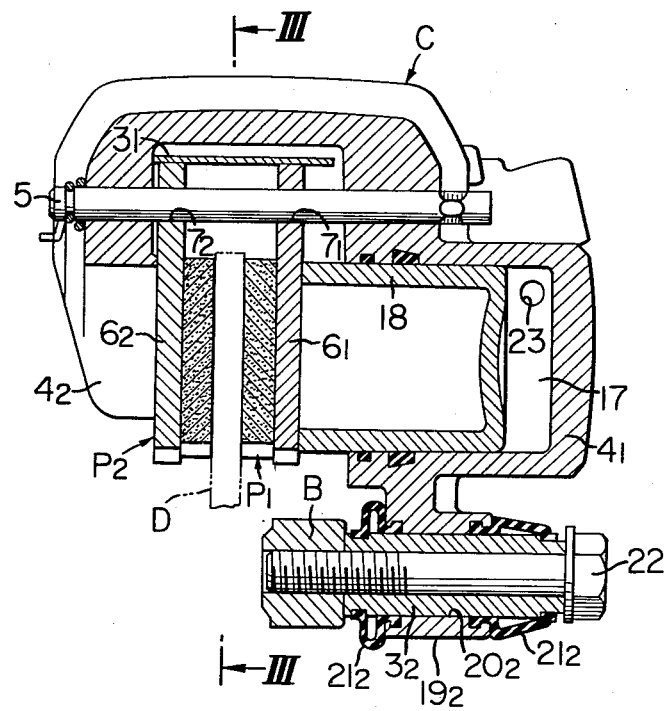
FIG. 2 is a cross-sectional view taken along the irregular line II—II in FIG. 1.
Figure 3:
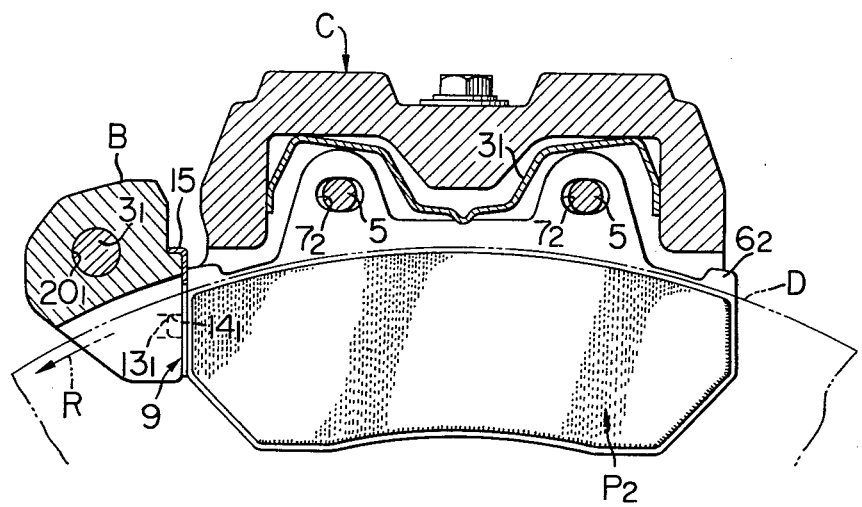
FIG. 3 is a cross-sectional view taken along the line III—III in FIG. 2.

The brake caliper C includes, as seen in FIG. 2, first and second limbs $4_1$ and $4_2$ straddling the brake disc D and a first and a second friction pad $P_1$ and $P_2$ arranged on the opposite sides thereof. Referring also to FIG. 3, a pair of hanger pins 5 are removably fitted through the caliper limbs $4_1$ and $4_2$ to extend therebetween parallel to the axis of rotation of brake disc D and on which pins a pair of backing plates $6_1$ and $6_2$, carrying respective friction pads $P_1$ and $P_2$, are slidably suspended. Formed in the backing plates $6_1$, $6_2$ are through holes $7_2$ which receive the hanger pins 5 and which are elongated to allow the friction pads $P_1$ and $P_2$ to move within a limited range in the circumferential direction of brake disc D relative to the brake caliper C. The range of movement is such that the trailing end faces of the backing plates $6_1$ and $6_2$ are engageable with the respective limbs $1_1$, $1_2$ of bracket B, and particularly with a pair of torque-bearing surfaces $8_1$ and $8_2$ formed thereon in a common plane, through the medium of a single protecting plate 9 applied to the bracket limbs (see FIG. 5).

The protecting plate 9, formed of resilient sheet material such as stainless steel sheet, is of inverted U-shape including a pair of spaced-apart leg portions $10_1$ and $10_2$ and an interconnecting web portion $10_3$. Formed on the back of the protecting plate 9 are a pair of upper detent lugs $11_1$, $11_2$ and a pair of lower detent lugs $13_1$, $13_2$. The upper detent lugs $11_1$, $11_2$ are located at the opposite ends of the top edge of protecting plate 9 and are bent out of the plane thereof rearwardly at an acute angle to the plane. The lower detent $13_1$, $13_2$ are punched rearwardly from the respective leg portions $10_1$, $10_2$ at an angle of about 90 degrees to the upper detent lugs $11_1$, $11_2$ and are slightly inclined, in this embodiment, away from each other in diverging relation.

The bracket B is formed along the top edges of torque-bearing surfaces $8_1$, $8_2$ with a detent shoulder 12 engageable with the upper detent lugs $11_1$, $11_2$ on the protecting plate 9 and in the torque-bearing surfaces $8_1$, $8_2$ at a substantial distance from the detent shoulder 12 with a pair of detent holes $14_1$ and $14_2$ respectively engageable with the lower detent lugs $13_1$, $13_2$ on the protecting plate 9.

With the arrangements described, it will be noted that the protecting plate 9 can be readily mounted on the bracket B and securely held in place thereon by resilient engagement of the upper detent lugs $11_1$, $11_2$ on the detent shoulder 12 and of the lower detent lugs $13_1$, $13_2$ in detent holes $14_1$, $14_2$. Specifically the protecting plate 9 mounted on the bracket is held against vertical movement relative thereto by the resilient retention forces of the upper and lower detent lugs $11_1$–$11_2$ and $13_1$–$13_2$ biased to grip therebetween the adjacent section of the bracket and against lateral movement by the resilient retention forces of the two lower detent lugs $13_1$ and $13_2$ biased to spread apart the bracket limbs $1_1$, $1_2$. In this manner, the protecting plate 9 is securely held in place on the bracket B by the resilient retention forces acting in two different directions substantially normal to each other and there arises no danger of the protecting plate loosening or falling off the bracket.

Referring again to FIG. 5, protecting plate 9 is further formed between the upper detent lugs $11_1$ and $11_2$ with an auxiliary detent lug 15, of relatively large width, that extends rearwardly from the top edge of the protecting plate substantially at right angles to the plane thereof. As will readily be noted, in the event that one or both of the upper detent lugs $11_1$, $11_2$ are broken off or otherwise damaged, the auxiliary detent lug 15 serves the purpose of holding the protecting plate 9 in place on the bracket B in cooperation with the lower detent lugs $13_1$ and $13_2$.

Further, the width $l_1$ of protecting plate 9, that is, the distance between the outside edges of respective leg portions $10_1$ and $10_2$ thereof, is made larger than the distance, $l_2$, between the outside edges of respective torque-bearing surfaces $8_1$ and $8_2$ of the bracket. Formed on such protecting plate 9 along the outside edges of respective leg portions $10_1$ and $10_2$ are a pair of guide lugs $16_1$ and $16_2$ which are rearwardly bent out of the plane of protecting plate 9 in diverging relation to each other just like the lower detent lugs $13_1$ and $13_2$. This ensures that, in assembling the brake unit, when the brake caliper C is slid sidewise, for testing its slidability on the bracket, beyond the limits of its sliding stroke upon brake application, there arises no engagement of the friction pads $P_1$ and $P_2$ with the side edges of protecting plate 9, enabling such sliding to be conducted smoothly.

As seen in FIGS. 1 and 2, brake caliper C is provided in one of its limbs, $4_1$, with a pair of oil-hydraulic cylinders 17 and 17′ which are spaced apart from each other vertically and circumferentially of the brake disc D in the state of caliper C normally positioned on the vehicle body F, as illustrated in FIG. 1 in solid lines. Slidably fitted in the oil-hydraulic cylinders 17, 17′ are a pair of pistons 18 and 18′ for abutting engagement with the back surface of backing plate $6_1$ of the first friction pad $P_1$. The other limb $4_2$ of caliper C is in abutting engagement with the backing plate $6_2$ of second friction pad $P_2$, as shown.

Further, the brake caliper C is formed as integral parts thereof with an upper lug $19_1$ which extends from the top side wall of upper oil-hydraulic cylinder 17 to the top end of the bracket B and a lower lug $19_2$ which extends forwardly from between the upper and lower oil-hydraulic cylinders 17, 17′ and, at these lugs $19_1$, $19_2$, is connected to the bracket B by means of first and second slide pins $3_1$ and $3_2$, as will be described below in detail.

Figure 4:
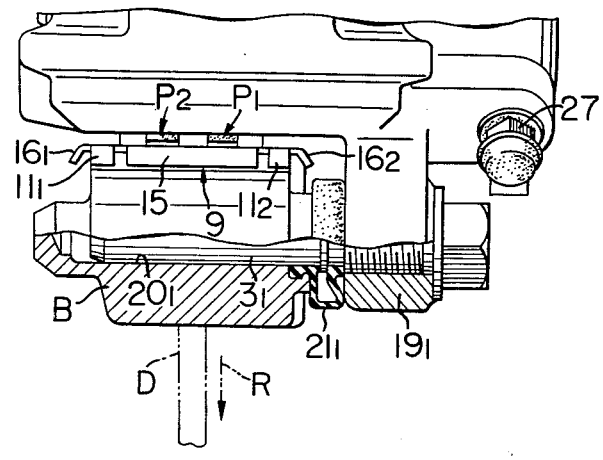
FIG. 4 is a fragmentary plan view, partly in cross section, of the disc brake shown in FIGS. 1 to 3.

Referring first to FIG. 4, the first slide pin $3_1$, having a threaded neck portion, is threadably mounted on the upper lug $19_1$ of caliper C and slidably fitted into a support hole $20_1$ formed in the top end of bracket B. To protect the sliding surface of slide pin $3_1$ from intrusion of any grit or other foreign matter, a sealing boot $21_1$ is fitted in compression between the caliper lug $19_1$ and the adjacent side of bracket B. Referring next to FIG. 2, the second slide pin $3_2$ is generally of hollow-cylindrical shape and is removably secured to the same side of bracket B at a point adjacent to the other end thereof by means of a threaded bolt 22 and is itself slidably fitted in a support hole $20_2$ formed in the lower lug $19_2$ of brake caliper C. To protect the sliding surface of the second slide pin $3_2$, sealing boots $21_2$ are fitted in compression between the caliper lug $19_2$ and the opposite ends of slide pin $3_2$. As seen in FIG. 1, the second slide pin $3_2$ is arranged as close as possible to the mid-portion of the caliper limb $4_1$ that bridges the two oil-hydraulic cylinders 17, 17′, filling the space defined therebetween on one side of the caliper limb $4_1$. Also, the two slide pins $3_1$ and $3_2$ are located substantially on the opposite sides of the upper oil-hydraulic cylinder 17.

Formed in the bridging wall between the upper and lower oil-hydraulic cylinders 17, 17′ is an oil passage hole 23 interconnecting the two cylinders. Reference numeral 24 indicates a through hole formed in the bottom wall of lower oil-hydraulic cylinder 17′ on one side thereof for machining the communicating hole 23. That is to say, in order to form the communicating hole 23, first the through hole 24 and then the communicating hole 23 are formed by drill means working from beneath the caliper limb $4_1$. As shown, the through hole 24 is closed by threadably fitting a blind plug 25 therein.

Formed through the top wall of upper oil-hydraulic cylinder 17 is an air bleed hole 26 in the top opening of which is threadably fitted an air bleed stopper 27.

Further, the first limb $4_1$ of bracket caliper C is formed therein with an oil pressure inlet port 28 opening into the communicating hole 23 and to which port an oil pressure conduit 29 leading from a brake master cylinder, not shown, is connected by means of a banjo joint 30.

In FIGS. 2 and 3, reference numeral 31 indicates a spring pad provided between the bracket limbs $4_1$, $4_2$ to restrain the friction pads $P_1$, $P_2$ against oscillatory movement.

Description will next be made of the operation of the above-described embodiment of the present invention.

During travel of the vehicle, upon brake application, the output oil pressure of the brake master cylinder is transmitted through the conduit 29, inlet port 28 and communicating passage 23 into the two oil-hydraulic cylinders 17 and 17′ to drive the pistons 18 and 18′ forwardly against the backing plate $6_1$ so that the first friction pad $P_1$, carried on the backing plate $6_1$, is more or less slid along the hanger pins 5 and 5′ into pressure engagement with the adjacent face of brake disc D. By reaction against such pressure engagement, the brake caliper C is moved in the direction opposite to that of the working stroke of pistons 18, 18′, carrying the first and second slide pins $3_1$, $3_2$ in the support holes $20_1$, $20_2$ axially thereof, so that the second caliper limb $4_2$ acting on the adjacent backing plate $6_2$ forces the second friction pad $P_2$ into pressure contact with the opposite face of brake disc D. In this manner, the brake disc D, rotating in the direction of the arrow R, is effectively braked under the combined effect of friction pads $P_1$ and $P_2$. During the brake operation, the braking torque appearing as a drag of brake disc D on the friction pads $P_1$, $P_2$ is sustained by the torque-bearing surfaces $8_1$ and $8_2$ of bracket B through the intermediary of protecting plate 9 mounted thereon. This may result in more or less bending deformation of the bracket B but there arises practically no change in distance between the axes of the slide pins $3_1$ and $3_2$ on the bracket as they are arranged in a plane extending substantially radially of the brake disc D. In addition, since the second slide pin $3_2$ is located close to the center of combined thrust of pistons 18 and 18' and since the two slide pins $3_1$, $3_2$ on the opposite sides of upper piston 18 are arranged with a minimum distance from each other, the brake caliper C is smoothly slidable on the bracket B to equalize the contact pressures between friction pads $P_1$ and $P_2$ acting on the brake disc D so that at all times effective brake performance is ensured.

To replace worn friction pads $P_1$, $P_2$ with fresh ones, first the bolt 22 is removed to release the second slide pin $3_2$ from the bracket B. Then, the brake caliper C is swung up about the axis of first slide pin $3_1$ radially outwardly of the brake disc D, as indicated in FIG. 1 by the chain-dotted lines, to obtain beneath the brake caliper so swung an ample space for replacement work which is clear of bracket B, the wheel axle (not shown) or any other obstruction. In this condition, the friction pads $P_1$ and $P_2$ can be readily taken out from between the limbs $4_1$, $4_2$ of the caliper C by drawing out the hanger pins 5 therefrom. The procedure to mount fresh friction pads is the reverse of that just described for removal of the worn ones. Replacement of the protecting plate 9 can also be performed with ease with the brake caliper C swung out in the manner described.

The embodiment shown and described herein may be modified in various ways within the scope of the present invention. For example, in place of the two upper detent lugs $11_1$, $11_2$ on the protecting plate 9, a single upper detent lug may be formed thereon that is effective to securely hold the plate 9 in place on the bracket B in cooperation with the lower detent lugs $13_1$, $13_2$. Further, the lower detent lugs $13_1$, $13_2$ may alternatively be formed to extend in converging relation to each other or slightly inclined toward each other.

To summarize, according to the present invention, the bracket B is formed along the top edges of its torque-bearing surfaces $8_1$, $8_2$ with a detent shoulder 12 and in the respective torque-bearing surfaces $8_1$, $8_2$ with detent holes $14_1$ and $14_2$. On the other hand, the protecting plate 9 for the torque-bearing surfaces $8_1$, $8_2$ is formed on its back with at least one upper detent lug, such as $11_1$, which extends rearwardly to engage on the detent shoulder 12, and with a pair of laterally spaced-apart lower detent lugs $13_1$ and $13_2$ which extend rearwardly to engage in the respective detent holes $14_1$, $14_2$, and can be held in place on the bracket B with resilient retention forces of the upper and lower detent lugs acting in two different directions substantially normal to each other. As will readily be appreciated, such protecting plate 9 can be securely mounted on the bracket B without the danger of loosening or falling off the bracket in spite of the extremely simple construction including the detent shoulder 12 and detent holes $14_1$, $14_2$ on the bracket and at least three detent lugs on the protecting plate 9. Moreover, the detent shoulder 12 and detent holes $14_1$, $14_2$ can be readily machined to fine limits of accuracy as they are formed immediately above and in the torque-bearing surfaces $8_1$, $8_2$ of the bracket B, which are machine-finished. This enables the protecting plate 9 to be mounted on the bracket smoothly without any strain. In other words, the stress developing in the protecting plate 9 during its assembling on to the bracket can be minimized so that any deformation of the plate is effectively prevented and its durability improved. Furthermore, it will be readily noted that formation of the detent shoulder 12 and detent holes $14_1$, $14_2$ never causes any substantial reduction in rigidity of the bracket B.

What is claimed is:

1. In a disc brake for vehicular use of the type including a brake disc, a bracket having a pair of limbs and a pair of torque-bearing surfaces formed on the respective limbs in a common plane and firmly attachable to a body portion of the vehicle in straddling relation to the brake disc, a pair of friction pads on the opposite sides of the brake disc, a brake caliper connected to the bracket in straddling relation to the brake disc and carrying the friction pads with trailing end faces of the latter disposed facing the respective torque-bearing surfaces of the bracket, means on the brake caliper for pressing the friction pads against the opposite faces of the brake disc, and a single protecting plate mounted on the bracket to cover the torque-bearing surfaces of the bracket, and improvement comprising:

a detent shoulder on the bracket along the top edges of the torque-bearing surfaces thereof;

a pair of detent holes provided in the respective torque-bearing surfaces of the bracket;

upper detent lug means on the back of the protecting plate for engagement with said detent shoulder; and lower detent lug means on the back of the protecting plate for engagement with said respective detent holes;

said upper and lower detent lug means being arranged to cooperatively hold the protecting plate in place on the bracket with resilient retention forces acting in two different directions substantially normal to each other, said upper detent lug means including two detent lugs on the protecting plate at opposite ends of the top edge thereof extending rearwardly therefrom, said lower detent lug means including a pair of lower detent lugs on the back of the protecting plate at locations corresponding to said respective detent holes in the torque-bearing surfaces of the bracket.

2. The improved disc brake as claimed in claim 1, in which said upper detent lug means further includes an auxiliary detent lug on the protecting plate between said two detent lugs to extend rearwardly from the top edge of the protecting plate.

3. The improved disc brake as claimed in claim 1 in which said protecting plate is bent rearwardly along the opposite side edges thereof to form guide lugs at said side edges.

4. The improved disc brake as claimed in claim 1 wherein said lower detent lugs extend at an angle relative to one another to engage with friction in said detent holes in the bracket.

5. The improved disc brake as claimed in claim 1 wherein said upper and lower detent lugs are bent from the protecting plate respectively at right angles to one another.

6. The improved disc brake as claimed in claim 5 wherein the pair of lower detent lugs are bent from the protecting plate at a location between the upper and lower edges of the protecting plate.

* * * * *